(12) United States Patent
Miura et al.

(10) Patent No.: US 6,529,324 B1
(45) Date of Patent: Mar. 4, 2003

(54) OPTICAL COMPONENT AND METHOD OF MANUFACTURING THE SAME

(75) Inventors: Hideshi Miura, Tokyo (JP); Toshio Tokairin, Tokyo (JP); Tadatoshi Hosokawa, Tokyo (JP); Haruhiko Tsuchiya, Tokyo (JP)

(73) Assignee: Tokin Corporation, Sendai (JP)

( * ) Notice: Subject to any disclaimer, the term of this patent is extended or adjusted under 35 U.S.C. 154(b) by 0 days.

(21) Appl. No.: 09/696,682

(22) Filed: Oct. 26, 2000

(30) Foreign Application Priority Data

Oct. 28, 1999 (JP) .......................................... 11-307194

(51) Int. Cl.$^7$ ................................................ G02B 5/30
(52) U.S. Cl. ........................ 359/484; 359/483; 359/494; 359/497; 359/500
(58) Field of Search .................................. 359/494, 497, 359/484, 483, 500; 228/208

(56) References Cited

FOREIGN PATENT DOCUMENTS

JP         2001-242419 A    * 9/2001

* cited by examiner

*Primary Examiner*—Audrey Chang
*Assistant Examiner*—Craig Curtis
(74) *Attorney, Agent, or Firm*—McGinn & Gibb, PLLC

(57) ABSTRACT

In a method of manufacturing an optical component, long-shaped members 2e, 2f each for a polarizer, 3a for a Faraday rotator, 4a for a compensator are fixed on the substrate 1 by an epoxy adhesive to fabricate an interim article. The interim article is then adhered on a glass substrate 9 by wax 10. The interim article is then cut into pieces each of which is used as an optical component for an optical isolator.

20 Claims, 6 Drawing Sheets

OPTICAL COMPONENT AND METHOD OF MANUFACTURING THE SAME

BACKGROUND OF THE INVENTION

The present invention relates to an optical component, such as a non-reciprocal element, which is favorable to be used mainly as an optical passive component for optical communication, and a method of manufacturing the optical component.

Conventionally, an optical isolator has been used as an optical component for optical communication.

As will later be described more in detail, a conventional optical isolator generally comprises first and second polarizers, a Faraday rotator, a compensator, first and second substrates. In a method of manufacturing the conventional optical isolator, the first polarizer, the Faraday rotator and the compensator are cut into a predetermined size and then fixed by an adhesive on the first substrate which is cut in a uniform size. Then, the second polarizer is adhered on the first substrate by adhesive. Thereafter, the second substrate is adhered on the first polarizer, the Faraday rotator, the compensator, and the second polarizer from the side thereof opposite to that of the first substrate.

Another conventional optical isolator comprises a cylindrical metallic housing, primary and secondary polarizers, a Faraday rotator, and a ring-type magnet. Further, the metallic housing is composed in combination of a tubular housing member and a cap-type housing member. The primary polarizer, the Faraday rotator and the ring-type magnet is fixed in the tubular housing member while the secondary polarizer is fixed in the cap-type housing member. The ring-type magnet is inserted at a peripheral portion of the Faraday rotator.

However, the method of manufacturing the conventional optical isolator has a problem of requiring a lot of working time for assembling optical elements. Further, in the event of mounting the optical elements on the first substrate by a pair of tweezers, the optical elements are attracted to each other by surface tension of the adhesive, the solder or the glass solder. Accordingly, characteristics of the conventional optical isolator may adversely affected because of deposition of adhesive, solder or glass solder on an optical surface or slant and inclination of the optical elements.

Further, in the another conventional optical isolator, the ring-type magnet is located to enclose the Faraday rotator in order to provide magnetic field to the Faraday rotator. However, much cost is required for processing the ring-type magnet.

Furthermore, for assembling the conventional optical isolators into an LD module, and the like, by welding, whole of the optical elements are inserted in a metallic case. However, it is difficult and requires much cost to fabricate the metallic case which is smaller in size. Accordingly, it is difficult to fabricate the conventional optical isolators in a small size at a low cost.

SUMMARY OF THE INVENTION

It is therefore an object of the present invention to provide an optical component, such as a non-reciprocal element, which has excellent optical characteristics and excellent mass-producibility and in which each optical element thereof is fixed securely.

It is another object of the present invention to provide a method of manufacturing the optical component which has excellent optical characteristics and excellent mass-producibility, and in which each optical element thereof is fixed securely.

Other objects of the present invention will become clear as the description proceeds.

In an optical component of the present invention when a polarizer or a Faraday rotator is fixed on a substrate, it is not required to cut each of the above-mentioned optical elements into pieces. On the contrary, the optical component of the present invention is formed as follows. Namely, at first, the substrate is cut into a strip having a predetermined width while each of the optical elements is cut into a strip having a predetermined width. Next, each of the strip-shaped optical elements is mixed on the strip-shaped substrate. Then, the substrate and the optical elements fixed thereon are cut simultaneously to have a predetermined size. Besides, a birefringent crystal can be alternatively used as the polarizer.

The method of manufacturing the optical component of the present invention are carried out, as described below. At first, primary and secondary substrates are cut into a strip having a predetermined width while each of a polarizer or a birefringent crystal, and a Faraday rotator is cut into a strip having a predetermined width. Next, each of the strip-shaped polarizer or the strip-shaped birefringent crystal, and the strip-shaped Faraday rotator is fixed on the strip-shaped primary substrate. Then, secondary substrate cut into a strip having a predetermined width is fixed on the strip-shaped polarizer or the strip-shaped birefringent crystal, and the strip-shaped Faraday rotator from another sides thereof opposite to the sides on which the primary substrate is fixed. Thereafter, the optical component is produced by cutting the optical elements and the primary and secondary substrates in a predetermined size simultaneously.

Further, according to an optical component of the present invention, an optical component consisting of a non-reciprocal element, such as an optical isolator, an optical circulator, and the like is provided. In the optical component, a Faraday rotator can be supplied with magnetic field without using a ring-shaped magnet by enclosing a polarizer and the Faraday rotator with four pieces of plate-like magnets. A processing cost of a plate-like magnet is smaller than that of a ring type magnet. It is therefore possible to provide an optical component which can be manufactured at a lower cost.

Furthermore, according to an optical component of the present invention, an optical component consisting of a non-reciprocal element, such as an optical isolator, an optical circulator, and the like is provided. In the optical component, it is not necessary to contain a polarizer and a Faraday rotator in a metallic housing by fixing the polarizer and the Faraday rotator on a substrate by the use of magnets which can be welded. Since the metallic housing is not required for the optical component, reduction of costs and down sizing of the optical component can be achieved. Besides, a birefringent crystal can be alternatively used as the polarizer.

Moreover, according to a method of manufacturing an optical component of the present invention, a semi-manufactured article of the optical component is cut into a strip of a predetermined width and then fixed on a substrate. Consequently, it becomes easy to make an optical isolator, an optical circulator, and the like be positioned by an instrument. Therefore, it is possible to reduce not only slant or inclination of the optical component but also unnecessary deposition of an adhesive to the optical component. Accordingly, an optical component consisting of a non-reciprocal element, such as an optical isolator, an optical circulator, and the like, can be manufactured to have stable and reliable characteristics.

In addition, according to a method of manufacturing an optical component of the present invention, the strip-shaped semi-manufactured article of the optical component may be fixed on a glass substrate. Thereafter, the strip-shaped semi-manufactured article of the optical component and the glass substrate may be cut simultaneously. Accordingly, it is possible to reduce man-hour for manufacturing the optical component to a large extent.

Namely, according to an aspect of the present invention, there is provided an optical component comprising: polarizing means, a Faraday rotator and a substrate, the polarizing means and the Faraday rotator being fixed on the substrate by at least two surfaces except for each optical surface thereof, respectively, the substrate consisting of magnet which can be welded.

The polarizing means may be composed of a polarizer or a birefringent crystal.

The optical component may be for use in a non-reciprocal element, such as an optical isolator and an optical circulator.

According to another aspect of the present invention, there is provided a method of manufacturing an optical component, the method comprising the steps of: preparing first lengthy consisting of a material for polarizing means; preparing second lengthy consisting of a material for a Faraday rotator; fixing the first lengthy and the second lengthy on a substrate; cutting the first lengthy, the second lengthy and the substrate through the whole thereof into a plurality of pieces each having a predetermined size; and each of the a plurality of pieces being used as the optical component.

The polarizing means may be composed of two polarizers or two birefringent crystals.

The substrate may consist of magnet which can be welded.

According to still another aspect of the present invention, there is also provided a method of manufacturing an optical component, the method comprising the steps of: preparing first lengthy consisting of a material for polarizing means; preparing second lengthy consisting of a material for a Faraday rotator; fixing the first lengthy and the second lengthy by two substrate with the first lengthy and the second lengthy being interposed therebetween; cutting the first lengthy, the second lengthy and the two substrate through the whole thereof into a plurality of pieces each having a predetermined size; and each of the a plurality of pieces being used as the optical component.

DETAILED DESCRIPTION OF THE PREFERRED EMBODIMENTS

Figure 1A:
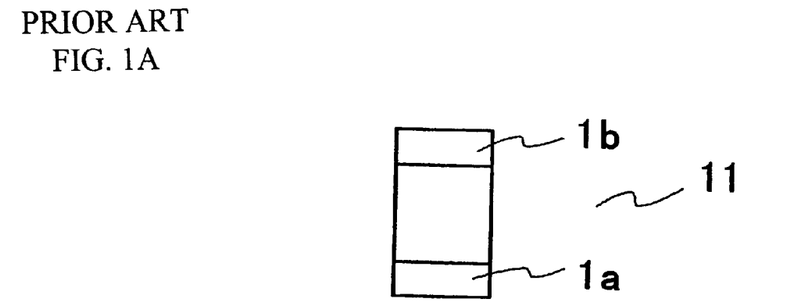
FIG. 1A is a front view for explaining an example of a conventional optical isolator.
Figure 1B:
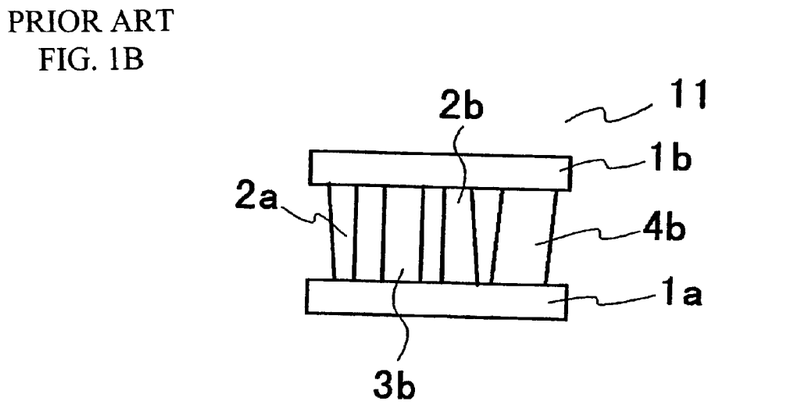
FIG. 1B is a side view for explaining the example of the conventional optical isolator illustrated in FIG. 1A.
Figure 2:
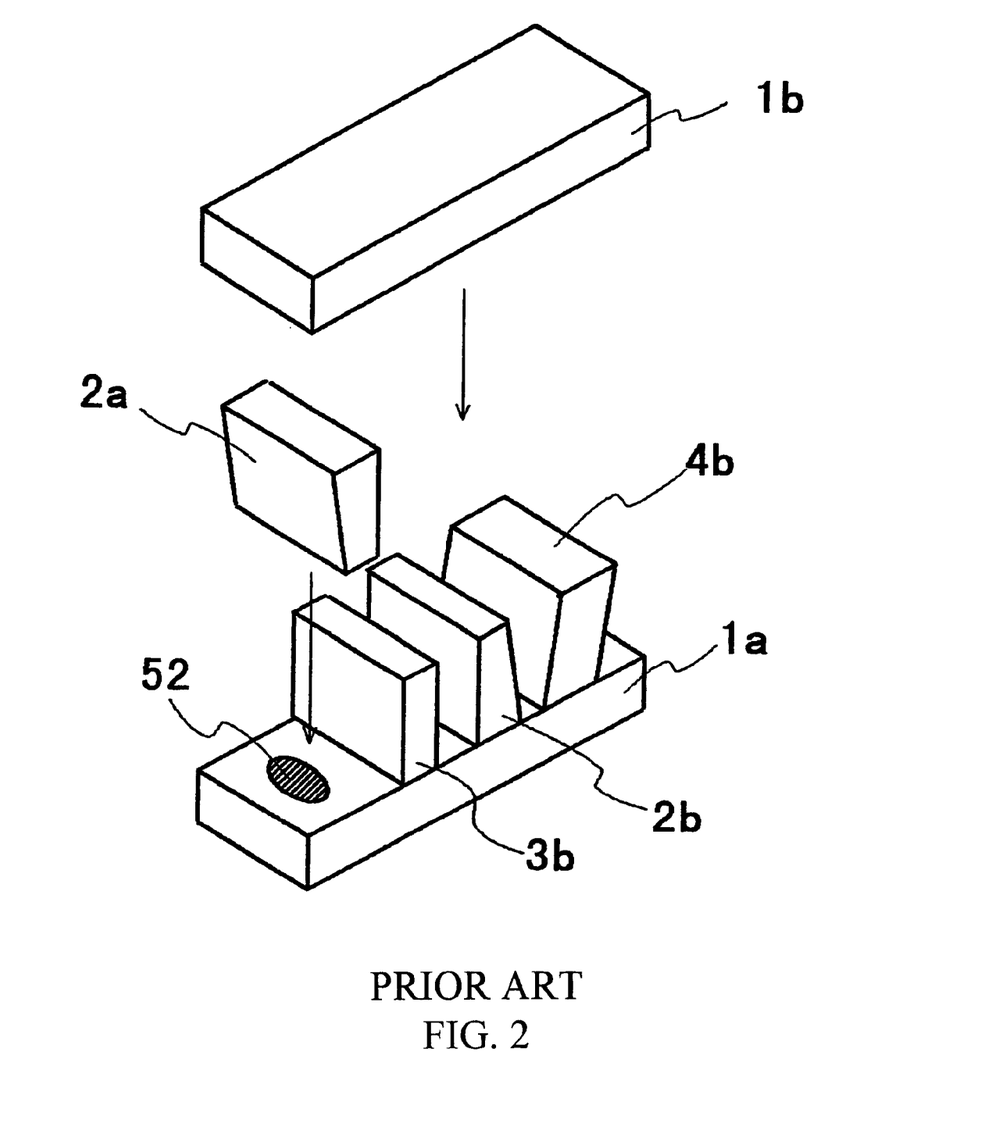
FIG. 2 is a view for schematically showing a conventional method of manufacturing an optical isolator.
Figure 3A:
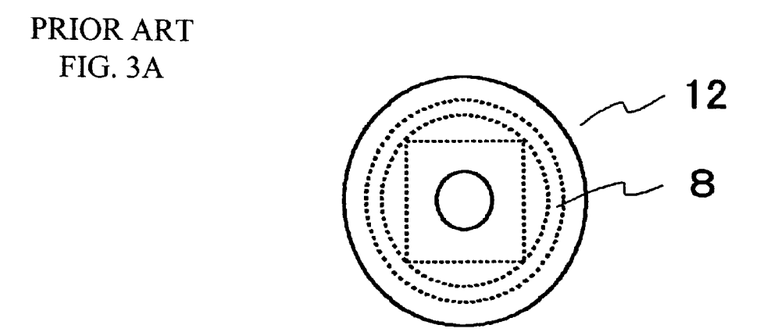
FIG. 3A is a front view for explaining another example of a conventional optical isolator.
Figure 3B:
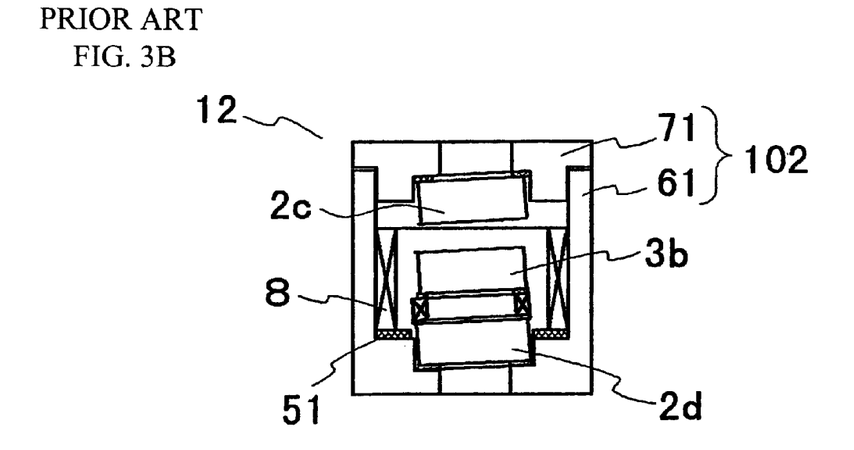
FIG. 3B is a side view for explaining the another example of the conventional optical isolator illustrated in FIG. 3A.

Referring to FIGS. 1 through 3, description is, at first made about conventional optical components and a method of manufacturing one of the conventional optical components in order to facilitate an understanding of the present invention.

FIG. 1 shows a conventional optical isolator. FIG. 1A is a front view of the conventional optical isolator while FIG. 1B is a side view thereof. In FIGS. 1A and 1B, an optical isolator 11 comprises two sheets of polarizers 2a and 2b, a Faraday rotator 3b, a compensator 4b, and two sheets of substrate 1a and 1b. In the illustrated example, materials of the substrate 1a and 1b are general ferritic magnetic materials.

FIG. 2 is an explanatory view for explaining a method of manufacturing the conventional optical isolator 11 illustrated in FIG. 1. In FIG. 2, a semi-manufactured article of the optical isolator 11 is composed of polarizer 2b, Faraday rotator 3b, a substrate 1 a and the compensator 4b. The polarizer 2b, the Faraday rotator 3b and the compensator 4b are cut into a predetermined size and then fixed by an adhesive on the substrate 1a which is cut in a uniform size. In the process of manufacturing the optical isolator 11, the polarizer 2a is adhered on the substrate 1a by the adhesive 52 and the substrate 1b is securely adhered on the opposite side of the substrate 1a in the above-mentioned semi-manufactured article. Besides, an organic adhesive, a solder or a glass solder is usable as the adhesive 52.

The conventional optical isolator and the method of manufacturing the conventional optical isolator have several problems, as mentioned below. The method of manufacturing the conventional optical isolator shown in FIG. 1 has a problem of requiring a lot of working time for the assembling. Further, as shown in FIG. 2, in the event of mounting optical elements on a substrate by a pair of tweezers, the optical elements are attracted to each other by surface tension of the adhesive, the solder or the glass solder. Accordingly, characteristics as an optical isolator may adversely affected because of deposition of adhesive, solder or glass solder on an optical surface or slant and inclination of an optical element.

FIG. 3 shows another example of a conventional optical isolator. FIG. 3A is a front elevational view while FIG. 3B is a side elevational view. In FIGS. 3A and 3B, an optical isolator 12 comprises a cylindrical metallic housing 102 two sheets of polarizers 2c and 2d, a Faraday rotator 3b and a ring-type magnet 8. Furthers the metallic housing 102 is composed in combination of a tubular housing member 61 and a cap-type housing member 71. The polarizer 2d, the Faraday rotator 3b and the ring-type magnet 8 are fixed in the tubular housing member 61 and polarizer 2c is fixed in the cap-type housing member 71. The ring-type magnet 8 is inserted at a peripheral portion of the Faraday rotator 3b.

Thus, the ring-type magnet 8 is located to enclose the Faraday rotator 3b in order to provide magnetic field to the Faraday rotator 3b. However, a great deal of cost is required for processing the ring-type magnet 8.

Furthermore, for assembling the conventional optical isolators of FIG. 1 and FIG. 3 into an LD module, and the like, by welding, whole portions of the optical elements are inserted in a metallic case. However, producing such a metallic case in smaller size is limited and requires high cost. Accordingly, it is difficult to fabricate the conventional optical isolator in a small size at a low cost.

Figure 4:
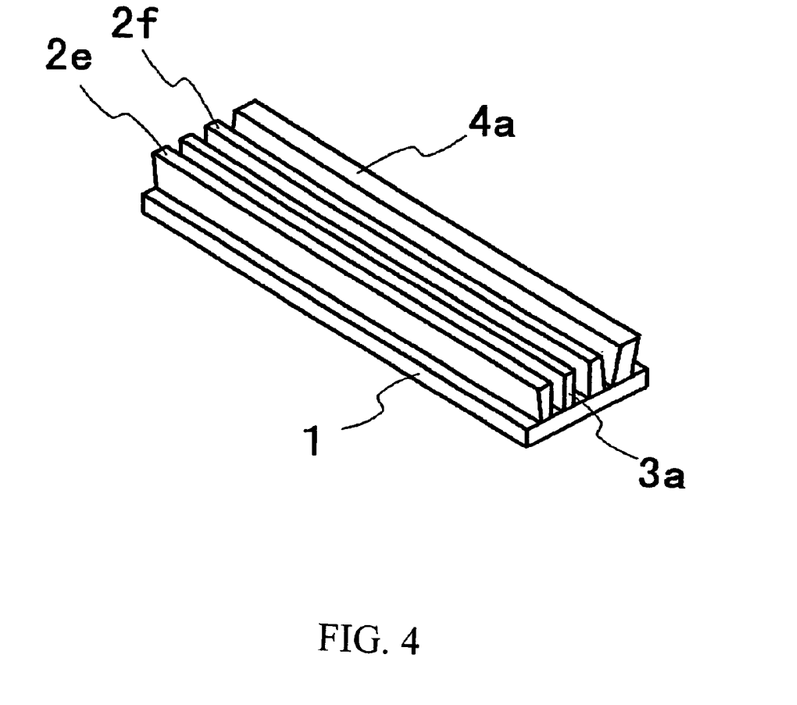
FIG. 4 is an explanatory view for showing an article to be processed in a method of manufacturing an optical component according to a preferred embodiment of the present invention.
Figure 5A:
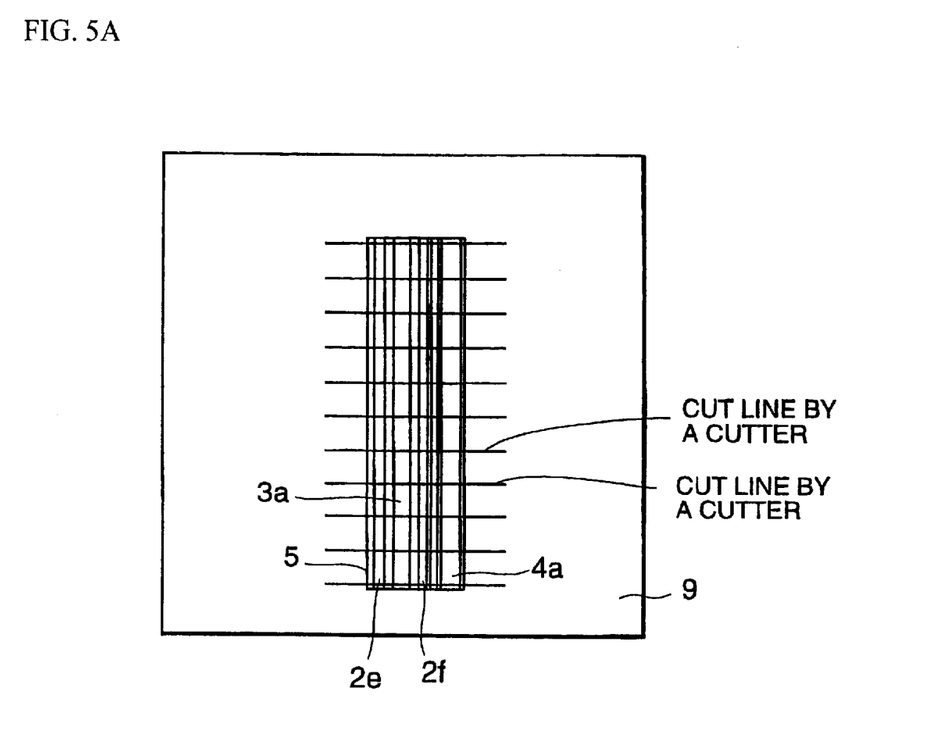
FIG. 5A is a plan view for explaining cutting process of the interim article to be processed in the method of manufacturing the optical component according to the preferred embodiment of the present invention.
Figure 5B:
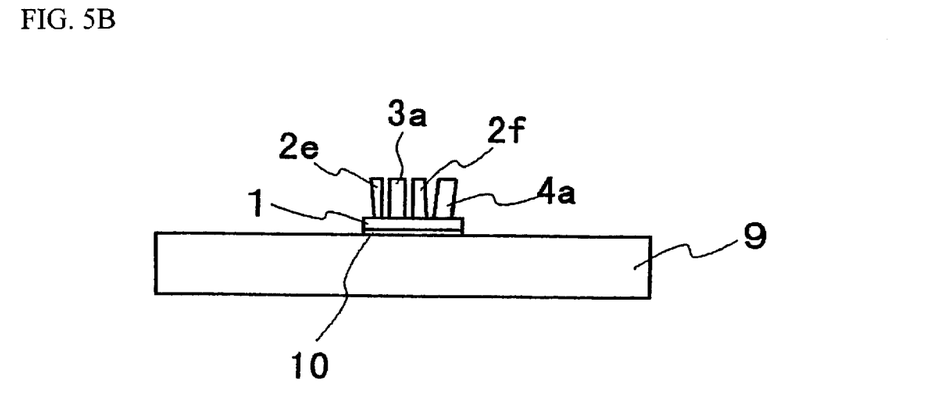
FIG. 5B is a side view for explaining the cutting process of the interim article to be processed illustrated in FIG. 5A.
Figure 6A:
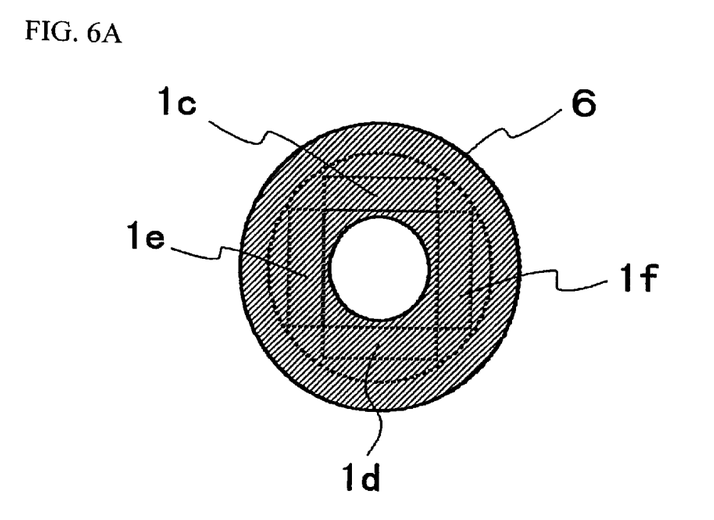
FIG. 6A is a front view for schematically showing an optical isolator according to an embodiment of the present invention.
Figure 6B:
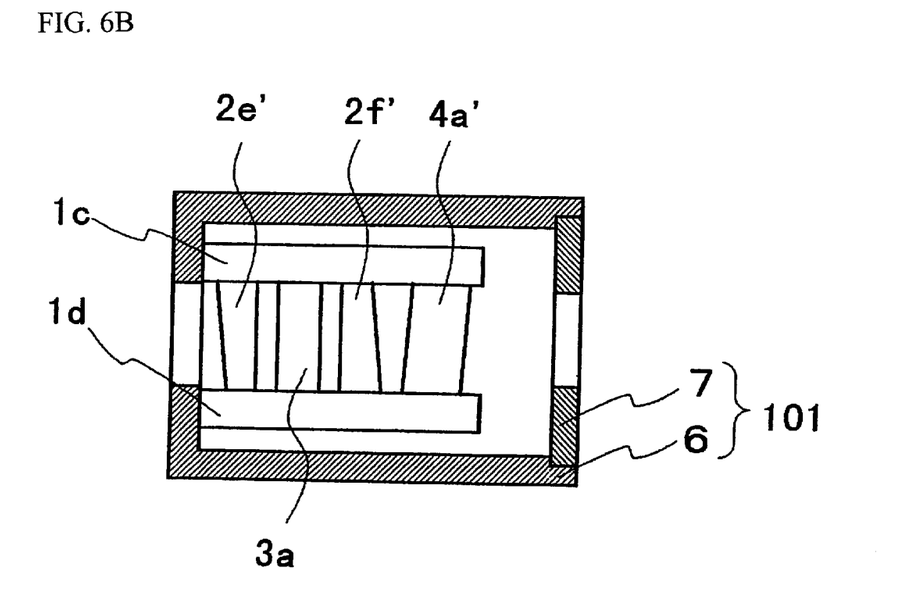
FIG. 6B is a side view for schematically showing the optical isolator illustrated in FIG. 6A.

Referring to FIGS. 4 through 6, description will proceed to an optical component and a method of manufacturing the optical component according to embodiments of the present invention.

FIG. 4 is an explanatory view for showing an interim article to be processed in a method of manufacturing an optical component according to a preferred embodiment of the present invention. In FIG. 4, illustrated is the interim article to be processed (in other words, semi-manufactured article), in which long-shaped members (lengthy) 2e, 3a, 2f, 4a, each consisting of a material for each optical element and each cut into a strip having a width of 1.2 mm, are fixed on a substrate 1, respectively. Namely, on the substrate 1, fixed are the long-shaped members (lengthy) 2e and 2f each consisting of a material for a polarizer, the long-shaped member (lengthy) 3a consisting of a material for a Faraday rotator, and the long-shaped member (lengthy) 4a consisting of a material for a compensator. Herein, the substrate 1 has a width of 3.1 mm. In addition, the substrate 1 consists of a magnetic material which can be welded. For example, an Fe—Cr—Co magnetic material can be selected as the material of the substrate 1.

In order to fabricate the interim article illustrated in FIG. 4, at first, an epoxy adhesive is coated on the substrate 1. The optical elements each cut into a strip having a width of 1.2 mm are positioned, respectively, by a positioning instrument (not shown) on the substrate 1. Thereafter, the optical elements are fixed thereon, respectively. With the condition, the substrate 1 and the optical elements fixed thereon are heated in an oven at a temperature of 120° C. to harden the epoxy adhesive.

In the example illustrated in FIG. 4, the long-shaped members (lengthy) 2e and 2f each consisting of a material for a polarizer are used. An interim article to be processed can be similarly fabricated by alternatively using long-shaped members (lengthy) consisting of a material for a birefringent crystal.

FIG. 5 is an explanatory view for showing cutting process of the interim article to be processed in the method of manufacturing the optical component according to the preferred embodiment of the present invention. As illustrated in FIGS. 5A and 5B, the interim article to be processed in which the epoxy adhesive is hardened by the oven is adhered on a glass substrate 9 by wax 10. The interim article to be processed is then cut by a cutter, as illustrated in FIG. 5A, into a plurality of pieces each of which has a width of 1.2 mm and each of which is used as an optical component. Herein, the optical component is an optical isolator which is an example of a non-reciprocal element.

FIG. 6A is a front view for schematically showing the optical isolator while FIG. 6B is a side view for schematically showing the optical isolator. As illustrated in FIG. 6A, three pieces of substrates 1d, 1e and 1f each of which is cut to have a size of 1.2 mm×3.1 mm are adhered and hardened on the optical isolator which is cut as illustrated in FIGS. 5A and 5B. The optical isolator having the adhesive hardened therein is then inserted into a tubular housing member 6. The substrates 1c, 1d, 1e and 1f are fixed at an end portion of the tubular housing member 6 by an adhesive, as shown in FIG. 6B. Thereafter, a cap-type housing member 7 is adhered and hardened on one lateral side of the above-mentioned tubular housing member 6. Accordingly, the optical isolator illustrated in FIGS. 6A and 6B is obtained.

In order to confirm optical characteristics of the optical isolator according to the above embodiment, an optical insertion loss and a reverse direction loss were investigated. As a result, it was confirmed that the optical insertion loss is 0.3 dB and the reverse direction loss is 25 dB. Thus, excellent optical characteristics are obtained in the optical isolator according to the above embodiment.

In the optical isolator according to the above embodiment, a metallic housing 101 consisting of the tubular housing member 6 and a cap-type housing member 7 is used. However, an optical isolator according to another embodiment can be considered, in which no metallic housing is used. In this case, the substrates 1c, 1d, 1e and 1f can be fixed directly on an LD (Laser Diode) module, and the like, by welding, because the substrates 1c, 1d, 1e and 1f consist of magnets which can be welded.

As described above, according to the present invention, long-shaped members (lengthy) each of which is consisting of a material for each optical element and each of which is cut into a strip having a predetermined width are fixed on a substrate, respectively. Consequently, it becomes easy to make an optical component be positioned by an instrument. Therefore, it is possible to reduce not only slant or inclination of an optical element but also unnecessary deposition of an adhesive to the optical element. Accordingly, an optical component can be manufactured to have stable and reliable characteristics.

Further, according to the present invention, optical elements each of which is cut into a strip having a predetermined width are fixed on a plate-like substrate, respectively. It thereby becomes possible to cut the optical component and the plate-like substrate simultaneously. Accordingly, it is possible to reduce man-hour for manufacturing the optical component to a large extent.

Furthermore, in the optical component, it is not necessary to use a ring-shaped magnet by enclosing the optical component with four pieces of plate-like magnets. A processing cost of the plate-like magnet is smaller than that of the ring-shaped magnet. It is therefore possible to provide an optical component which can be manufactured at a lower cost.

Moreover, the optical component is fixed by magnets which can be welded. It therefore becomes possible to make the optical component be welded to an LD (Laser Diode) module, and the like, without the metallic housing. Accordingly, reduction of costs and down sizing of the optical component can be achieved.

As mentioned above, according to the present invention, it is possible to provide an optical component, such as a non-reciprocal element, and a manufacturing method thereof, which has excellent optical characteristics and excellent mass-producibility, and in which each optical element thereof is fixed securely.

What is claimed is:

1. An optical component comprising:
   a polarizing means, a Faraday rotator and a substrate, said polarizing means and said Faraday rotator being fixed on said substrate by at least two surfaces except for each optical surface thereof, respectively, said substrate comprising four plate-type magnets which can be welded.

2. An optical component as claimed in claim 1, wherein said polarizing means is composed of a polarizer.

3. An optical component as claimed in claim 1, wherein said polarizing means is composed of a birefringent crystal.

4. An optical component as claimed in claim 1, wherein said optical component is for use in a non-reciprocal element.

5. An optical component as claimed in claim 4, wherein said non-reciprocal element is an optical isolator.

6. An optical component as claimed in claim 4, wherein said non-reciprocal element is an optical circulator.

7. A method of manufacturing an optical component, said method comprising:

preparing a first length comprising a material for polarizing means;

preparing a second length comprising a material for a Faraday rotator;

fixing said first length and said second length on a substrate;

cutting said first length, said second length and said substrate through the whole thereof into a plurality of pieces each having a predetermined size; and each of said a plurality of pieces being used as said optical component.

8. A method as claimed in claim 7, wherein said polarizing means are composed of two polarizers.

9. A method as claimed in claim 7, wherein said polarizing means are composed of two birefringent crystals.

10. A method as claimed in claim 7, wherein said substrate consists of magnet which can be welded.

11. A method as claimed in claim 7, wherein said optical component is for use in a non-reciprocal element.

12. A method as claimed in claim 11, wherein said non-reciprocal element is an optical isolator.

13. A method as claimed in claim 11, wherein said non-reciprocal element is an optical circulator.

14. A method of manufacturing an optical component, said method comprising:

preparing a first length comprising a material for polarizing means;

preparing a second length comprising a material for a Faraday rotator;

fixing said first length and said second length to two substrates with said first length and said second length being interposed therebetween;

cutting said first length, said second length and said two substrates through the whole thereof into a plurality of pieces each having a predetermined size; and each of said a plurality of pieces being used as said optical component.

15. A method as claimed in claim 14, wherein said polarizing means are composed of two polarizers.

16. A method as claimed in claim 14, wherein said polarizing means are composed of two birefringent crystals.

17. A method as claimed in claim 14, wherein said substrate consists of magnet which can be welded.

18. A method as claimed in claim 14, wherein said optical component is for use in a non-reciprocal element.

19. A method as claimed in claim 18, wherein said non-reciprocal element is an optical isolator.

20. A method as claimed in claim 18, wherein said non-reciprocal element is an optical circulator.

* * * * *